United States Patent [19]

Miwa et al.

[11] Patent Number: 5,401,553

[45] Date of Patent: Mar. 28, 1995

[54] COMPOSITIONS FOR CARPET BACKINGS

[75] Inventors: Masahiro Miwa, Hikami; Yoshio Kamatani, Osaka, both of Japan

[73] Assignee: Takeda Chemical Industries, Ltd., Osaka, Japan

[21] Appl. No.: 973,313

[22] Filed: Nov. 9, 1992

Related U.S. Application Data

[60] Division of Ser. No. 732,427, Jul. 18, 1991, abandoned, which is a continuation of Ser. No. 445,149, Dec. 5, 1989, abandoned, which is a continuation of Ser. No. 23,701, Mar. 9, 1987, abandoned.

[30] Foreign Application Priority Data

Mar. 17, 1986 [JP] Japan ................................. 61-60255
Mar. 17, 1986 [JP] Japan ................................. 61-60256

[51] Int. Cl.$^6$ ................. B32B 3/02; D03D 27/00; D04H 11/00; D05C 17/00
[52] U.S. Cl. .................................. 428/94; 428/95; 428/96; 524/507; 524/512; 524/407; 524/412; 524/413; 524/915
[58] Field of Search ............... 524/507, 512, 407, 412, 524/413, 915; 428/94, 95, 96

[56] References Cited

U.S. PATENT DOCUMENTS

| | | | |
|---|---|---|---|
| 2,994,672 | 8/1961 | Geerdes | 524/507 |
| 3,401,135 | 9/1968 | Sato | 524/507 |
| 3,853,599 | 12/1974 | Kamichika et al. | 524/510 |
| 3,864,195 | 2/1975 | Patterson | 428/95 |
| 4,009,310 | 2/1977 | Scobbo | 428/95 |
| 4,119,602 | 10/1978 | Isgur | 524/507 |
| 4,122,055 | 10/1978 | Tugukuni et al. | 524/513 |
| 4,297,261 | 10/1981 | Jozwiak | 523/413 |
| 4,396,738 | 8/1983 | Powell | 524/507 |
| 4,401,713 | 8/1983 | Takata | 523/413 |
| 4,431,689 | 2/1984 | Günter | 523/408 |
| 4,442,247 | 4/1984 | Ishikura | 524/512 |
| 4,452,930 | 6/1984 | Moriarity | 524/507 |
| 4,591,533 | 5/1986 | Antonelli | 524/512 |
| 4,609,690 | 9/1986 | Gruber | 524/507 |
| 4,624,762 | 11/1986 | Abbey | 524/507 |

FOREIGN PATENT DOCUMENTS

| | | | |
|---|---|---|---|
| 54-102334 | 8/1979 | Japan | 524/915 |
| 59-15465 | 1/1984 | Japan . | |
| 60-203685 | 10/1985 | Japan . | |

OTHER PUBLICATIONS

*General Chemistry* Brady et al. 1986 p. 873.

*Primary Examiner*—Paul R. Michl
*Assistant Examiner*—P. Niland
*Attorney, Agent, or Firm*—Wenderoth, Lind & Ponack

[57] ABSTRACT

A composition for carpet backings which comprises:
(a) an aqueous dispersion of a high molecular weight polymer; and
(b) a blocked polyisocyanate in amounts of about 0.5–30 parts by weight in relation to 100 parts by weight of the solids of the aqueous dispersion.

The composition preferably further contains a melamine resin in amounts of about 0.1–10 parts by weight, and/or a vulcanizing agent in amounts of about 0.5–10 parts by weight, each in relation to 100 parts by weight of the solids of the aqueous dispersion.

The carpet having backings formed with the composition is excellent in washability so that there takes place little shrinkage and curling after repeated washing.

8 Claims, No Drawings

COMPOSITIONS FOR CARPET BACKINGS

This application is a division of now abandoned application Ser. No. 07/732,427, filed on Jul. 18, 1991, now abandoned which is a continuation of now abandoned Ser. No. 07/445,149, filed on Dec. 5, 1989, now abandoned which is a continuation of now abandoned Ser. No. 07/023,701, filed on Mar. 9, 1987, now abandoned.

This invention relates to a composition for carpet backings.

Tufted carpets, a representative example of carpets, is composed of a primary backing cloth having piles of polyamides, polyvinyl alcohols or acrylics threaded therethrough to form pile loops on the surface of the fabric, and a backing formed on the backside of the fabric to fix the piles in place, preventing the piles from separating from the fabric. The backing has been heretofore formed by coating an aqueous dispersion composition including rubber latices on the backside of the fabric, drying and heating to cure the latexes to form backing resins.

Recently a carpet has been required to have a much improved washability, and in particular, a walk on-walk out (walk off) mat is strongly required to have such a high washability that there occurs little shrinkage in size, little curling and little separation of resins from the carpet after repeated washing.

A variety of compositions have been proposed to intend to meet such severe requirements of washability. For instance, a composition composed of an aqueous dispersion of polymers is disclosed in Japanese Patent Disclosure (Unexamined) No.59-15465. The composition is composed of a styrene-butadiene copolymer rubber latex having epoxy compounds and compounds containing aziridine rings added thereto. A further composition is also known which is composed of a rubber latex and a thermosetting resin such as methylol melamines, or a vulcanizing agent, or both. However, the carpets having the backings formed with these conventional compositions have been still found to be attended by dimensional change or separation of resins from the carpet after repeated washing under severe washing conditions.

It is, therefore, an object of the invention to provide a composition for carpet backings which has an excellent washability and thus meets the severe requirements as above described.

The composition for carpet backings of the invention comprises:

(a) an aqueous dispersion of a high molecular weight polymer; and
(b) a blocked polyisocyanate in amounts of about 0.5-30 parts by weight in relation to 100 parts by weight of the solids content of the aqueous dispersion.

The aqueous dispersion of high molecular weight polymers usable in the invention may be any one of polymer latices known in the art, and therefore, includes, for example, styrene-butadiene rubber (SBR) latices, methyl methacrylate-butadiene rubber (MBR) latices, acrylonitrile-butadiene rubber (NBR) latices, natural rubber (NR) latices, polyvinyl-chloride or vinylchloride copolymer latices, methyl methacrylate-styrene-butadiene rubber (MSBR) latices, acrylic latices and ethylene-vinyl acetate copolymer latices. These latices preferably contain functional groups therein such as carboxyls, hydroxyls, amides, glycidyls or sulfonic acid groups, especially carboxyls and/or hydroxyls. The manner in which the functional group is included in the polymer of the latex is not specifically limited, but such latices as have the functional group therein may be produced by, as an exemplification, the copolymerization of monomers forming main polymer chains and monomers having such functional side chains.

The blocked polyisocyanate used in the invention is an adduct of a polyisocyanate and a blocking agent, which adds to free isocyanate groups of the polyisocyanate, to form the adduct to make the isocyanate groups inactive, but readily dissociates from the isocyanate groups to regenerate free isocyanate groups when the adduct is heated to elevated temperatures, and/or put into contact with catalysts. The blocked polyisocyanate is already known as described in, for example, Japanese Patent Disclosure (Unexamined) No. 60-203685.

Any polyisocyanate is usable to form the blocked polyisocyanate, and thus the polyisocyanate includes, for example, aliphatic polyisocyanates such as ethylene diisocyanate, tetramethylene diisocyanate, hexamethylene diisocyanate, 2,4,4- or 2,2,4-trimethylhexamethylene diisocyanate or methyl 2,6-diisocyanatocaproate; alicyclic diisocyanates such as 3-isocyanatomethyl-3,5,5-trimethylcyclohexane, 1,3- or 1,4-bis-(isocyanatomethyl)cyclohexane, methylcyclohexane-2,4- or 2,6-diisocyanate, dicyclohexylmethane-4,4'-diisocyanate or 1,3- or 1,4-diisocyanatocyclohexane; aromatic diisocyanates such as m- or p-phenylene diisocyanate, mixtures of these, diphenylmethane-4,4'-diisocyanate, 2,4- or 2,6-tolylene diisocyanate or mixtures of these; and aromatic-aliphatic diisocyanates such as 1,3- or 1,4-bis(isocyanatomethyl)benzene or 1,3- or 1,4-bis(α-isocyanatopropyl)benzene. The polyisocyanate may be triisocyanates such as triphenylmethane-4,4',4''-triisocyanate, 1,3,5-triisocyanatobenzene, 1,3,5-tris(isocyanatomethyl)cyclohexane, 1,3,5-tris-(isocyanatomethyl)-benzene or 2-isocyanatoethyl 2,6-diisocyanatocaproate.

Other polyisocyanates are also usable to form the blocked polyisocyanate, such as polymeric polyisocyanates, e.g., dimers or trimers of diisocyanates, polymethylene polyphenylene polyisocyanates, various isocyanate terminated prepolymers which are obtainable by the reaction of polyisocyanates in excess and active hydrogen containing compounds, biuret derivatives or allophanate derivatives of polyisocyanates. These compounds may be used singly or as a mixture.

The active hydrogen containing compound usable is exemplified by low molecular weight compounds such as ethylene glycol, propylene glycol, diethylene glycol, dipropylene glycol, triethylene glycol, 2,2,4-trimethyl-1,3-pentanediol, neopentyl glycol, hexanediol, cyclohexanedimethanol, cyclohexanediol, hydrogenated bisphenol A xylylene glycol, glycerine, trimethylol ethane, trimethylol propane, hexanetriol, pentaerythritol, sorbitol, sucrose, castor oil, ethylenediamine, hexamethylenediamine, ethanolamine, triethanolamine, water, ammonia or urea, and a variety of high molecular weight compounds such as polyether polyol, polyester polyol, acrylic polyol or epoxy polyol.

The blocking agent is also known, and any of those known is usable in the invention. Therefore, the blocking agent usable includes, for example, phenol-type blocking agents such as phenol, cresol, p-nonylphenol or hydroxybenzoic acid ester; lactam-type blocking agents such as ε-caprolactam or γ-butyrolactam; active methylene-type blocking agents such as diethyl malonate, methyl acetoacetate or acetylacetone; alcohol-type blocking agents such as ethanol, isopropyl alcohol, t-butyl alcohol, lauryl alcohol, ethylene glycol monoethyl ether, benzyl alcohol, glycolic acid, glycolates such as methyl glycolate, ethyl glycolate or butyl glycolate, lactic acid, lactic acid esters such as methyl lactate, ethyl lactate or butyl lactate, diacetone alcohol or ethylene chlorohydrin; mercaptan- type blocking agents such as butyl mercaptan, octyl mercaptan, t-dodecyl mercaptan, 2-mercaptobenzothiazole or thiophenol; acid amide-type blocking agents such as acetanilide, acetamide, acrylamide or benzamide; imido-type blocking agents such as succinimide or phthalimide; amine-type blocking agents such as diphenylamine, carbazole, aniline, dibutylamine; imidazole-type blocking agents such as imidazole or 2-ethylimidazole; urea-type blocking agents such as urea, thiourea, ethylene thiourea; carbamate-type blocking agents such as 2-oxazolidone, phenyl N-phenyl carbamate; oxime-type blocking agents such as formaldoxime, acetaldoxime, acetoxime, methyl ethyl ketoxime, diacetyl monoxime, cyclohexanone oxime or benzophenone oxime; and sulfite-type blocking agents such as sodium bisulfite or potassium bisulfite.

The blocking agent may be used singly or as a mixture of two or more. However, among the above exemplified are preferred oxime-type ones because of their reactivity to polyisocyanates and safety in use.

The blocked polyisocyanate is obtained by reacting a polyisocyanate with a blocking agent in the conventional manner. The reaction may be carried out either in a solvent which has no active hydrogen or in the absence of a solvent. The solvent having no active hydrogen is exemplified by esters such as ethyl acetate, butyl acetate, cellosolve acetate, carbitol acetate or dimethylesters of dibasic acids; ketones such as methyl ethyl ketone, methyl isobutyl ketone or cyclohexanone; and aromatic hydrocarbons such as toluene, xylene, Solvesso #100 or Solvesso #150. When a bisulfite is used as a blocking agent, water is in many cases advantageously usable as a solvent.

The blocking reaction of polyisocyanates may be carried out in methods already known, and some examples of methods are as follows: a method wherein a polyisocyanate is reacted with a blocking agent at an equivalent ratio of NCO/blocking agent of about 0.9–1.1, preferably of about 0.95–1.0; a method wherein at first a polyisocyanate is reacted with a blocking agent at an equivalent ratio of NCO/blocking agent of about 1.1–3.0, preferably of about 1.2–2.0, and then the resultant product is reacted with such an active hydrogen containing compound as hereinbefore mentioned, either of low molecular weight or of high molecular weight; and a method wherein at first a polyisocyanate is reacted with an active hydrogen containing compound at an equivalent ratio of NCO/active hydrogen of about 1.5–10.0, preferably of about 2.0–7.0, and then, if necessary after the removal of the unreacted free polyisocyanates, the resultant is reacted with a blocking agent. However, the method of blocking is not limited to the above exemplified. When necessary, a known catalyst may be used in the blocking reaction. The catalyst includes, for example, tertiary amines and organotin compounds such as dibutyltin dilaurate, dibutyltin oxide, dibutyltin dichloride or tetrabutyl-1,3-diacetoxydistannoxane.

The blocked polyisocyanate is, preferably as an aqueous mixture such as an aqueous emulsion, aqueous dispersion or aqueous solution, admixed with the aforesaid aqueous dispersion of high molecular weight polymers. The blocked polyisocyanate may be formed into the aqueous mixture by any known method. Some examples are as follows: a method wherein the blocked polyisocyanate is mechanically fine-dispersed in water, if necessary, together with surfactants, protective colloids or dispersants to stabilize the resultant dispersion; a method wherein a salt-forming group is introduced into the blocked polyisocyanate, followed by the salt formation, or a hydrophilic group is introduced into the blocked polyisocyanate, followed by the self-emulsification or self-solubilization; and a method wherein a polyisocyanate is blocked by use of a hydrophilic blocking agent, thereby to provide the resultant blocked polyisocyanate with self-emulsifiability or water-solubility. Two or more of these methods may be combined together.

When a solvent is used in the blocking reaction, the resultant blocked polyisocyanate may be emulsified, dispersed or solubilized in water together with the solvent, and the solvent may be removed thereafter. However, the resultant blocked polyisocyanate may be emulsified, dispersed or solubilized in water after the removal of the solvent.

Further in the preparation of the aqueous mixture of the blocked polyisocyanate, it is advantageous in many cases to first add known isocyanate reaction catalysts such as tertiary amines or organometallic compounds, or dissociation catalysts of blocking agents to the blocked polyisocyanate produced, and then to form the resultant mixture into the aqueous mixture.

The backing composition of the invention comprises the aqueous dispersion of the high molecular weight polymer and the blocked polyisocyanate in amounts of about 0.5–30 parts by weight in relation to 100 parts by weight of the solids in the aqueous dispersion of the high molecular weight polymer. When the amount of the blocked polyisocyanate is less than about 0.5 parts by weight in relation to 100 parts by weight of the solids in the aqueous dispersion of the high molecular weight polymer, the resultant composition forms carpet backings which are deficient in washability, whereas when the amount of the blocked polyisocyanate is more than about 30 parts by weight, the resultant composition forms backing resins hard and brittle which are liable to crack or separate from the carpets. Furthermore, since the blocked polyisocyanate is more costly than the aqueous dispersion of high molecular weight polymer, it is disadvantageous to employ the blocked polyisocyanate in amounts more than sufficient for the requirements of the backing. It is, therefore, most preferred that the blocked polyisocyanate is contained in the composition in amounts of about 1–20 parts by weight in relation to 100 parts by weight of the solids of the aqueous dispersion of the high molecular weight polymer.

The composition of the invention is obtained by mixing the aqueous dispersion of the high molecular weight polymer with the blocked polyisocyanate preferably as such an aqueous mixture as aforesaid. If necessary, surfactants, dispersants or thickeners may be used together, or the pH may be controlled so as to obtain a more stabilized composition.

In the backing composition of the invention, a part of the blocked polyisocyanate may be displaced by epoxy compounds. The epoxy compound preferably usable in the invention includes bisphenol type, resorcinol type and alicyclic type, containing not less than two epoxy groups in average in the molecule, and besides these, the reaction products of aliphatic polyhydric alcohols such as ethylene glycol, propylene glycol, glycerine, hexanetriol, trimethylol propane or polyethyleneglycol with epichlorohydrin. The epoxy compound used may be water-soluble or water-insoluble, and it is added to the aqueous dispersion of the high molecular weight polymer as a solution or an emulsion depending upon the solubility of the epoxy compound in water.

The employment of the epoxy resin in the composition together with the blocked polyisocyanate shortens to some extent the pot life thereof, however, the composition provides carpet backings which are more excellent in washability. That is, the resultant backing resin is less separable from the carpet, and the resultant carpet is smaller in shrinkage and curling after washing. However, the employment of too large an amount of the epoxy resin makes the pot life of the composition extremely short, and from the viewpoint of balance between the properties and the usability of the resultant composition, the epoxy resin is preferably contained in the composition in amounts not more than about 10 parts by weight in relation to 100 parts by weight of the solids of the aqueous dispersion of the high molecular weight polymer.

The composition for carpet backings of the invention preferably further contains melamine resins, or vulcanizing agents, or both.

The melamine resin used in the invention includes methylol melamines which are, as well known, obtained by reacting melamine with formaldehyde in the presence of a basic catalyst, and methylated or butylated methylol melamines which are obtained by reacting the methylol melamines with methanol and butanol, respectively. When an water-soluble melamine resin is used, it may be added as it is to the aqueous mixture, whereas when an water-insoluble melamine resin is used, it may be at first formed into an aqueous emulsion or dispersion, and then is added to the aqueous dispersion of the high molecular weight polymer, similarly to the aqueous mixture of the blocked polyisocyanate.

The melamine resin is contained in the backing composition of the invention in amounts of about 1–10 parts by weight in relation to 100 parts by weight of the solids of the aqueous dispersion of the high molecular weight polymer. The amount of about 2–7 parts by weight in relation to 100 parts by weight of the solids of the aqueous dispersion is particularly preferred from the viewpoint of the balance of properties.

When the composition containing the melamine resin is coated on the backside of carpets, dried and heated, the blocking agent is dissociated from the blocked polyisocyanate to produce polyisocyanates having free isocyanate groups, which react in turn with the high molecular weight polymer and the melamine resin, to form three dimensional network structures in the resin, thereby resulting in backing resins for carpets excellent in washability.

The vulcanizing agent used in the invention includes, for example, sulfur and compounds which generate sulfur by being heated at elevated temperatures, and in addition thereto metal oxides such as zinc oxide. The sulfur includes powdered sulfur, either crystalline or amorphous, and colloidal sulfur, and the compounds which generate sulfur by being heated includes, for example, thiuram polysulfides, dithiodimorpholine and thioplasts. The vulcanizing agent is contained in the composition in amounts of about 0.5–10 parts by weight in relation to 100 parts by weight of the solids of the aqueous dispersion of the high molecular weight polymer, and in particular, the amount of about 1–5 parts by weight is preferred so that the composition forms backing resins especially excellent in washability and anti-blocking.

It is preferred that the vulcanizing agent is incorporated in to the composition in conjunction with vulcanization accelerators and activators. As vulcanization accelerators are usable dithiocarbamates, thiourea, guanidines, xanthates, thiurams, aldehyde amines or thiazoles; and as activators are usable zinc oxide, zinc carbonate, zinc stearate, stearic acid or oleic acid. The vulcanization accelerator and activator are well known in the rubber technology, and those other than the exemplified above are of course usable.

When the composition contains the vulcanizing agent therein, there takes place cross-linking of the high molecular weight polymer by the vulcanizing agent as well as the cross-linking of the polymer by the polyisocyanate generated when the composition is heated, thereby to form three dimensional structures in the backing resin, resulting backings excellent in washability.

Further when the composition contains both the melamine resin and the vulcanizing agent therein, the above described reactions take place concurrently, thereby to provide backing resins well-balanced in properties, and especially more excellent in washability.

The backing composition may further contains, in addition to the above ingredients, usually employed additives such as fillers, dispersants, anti-oxidants, thickeners, colorants, dissociation catalysts for blocked polyisocyanates or isocyanate reaction catalysts. As the filler are usable, for example, calcium carbonate, aluminum hydroxide, clay or talc, and these fillers may be incorporated in the composition usually in amounts not more than about 100 parts by weight in relation to 100 parts by weight of the solids of the aqueous dispersion of the high molecular weight polymer. The use in amount more than about 100 parts by weight of fillers may undesirably cause the deterioration of washability of the resulting backing.

In use of the backing composition of the invention, it is coated on the backside of carpets, dried and heated to about 110°–200° C., to provide a backing resin which is excellent in washability. The composition is applicable to all the carpets including tufted, knitted and hooked carpets of which backside is coated with a dispersion of high molecular weight polymers to form backing resins.

As set forth above, the backing composition for carpets according to the invention has a longer pot life than the conventional composition for the same purpose, and there occurs no problem if a long period has passed between the preparation and the use of the composition. Further since the composition forms three dimensional network structures including the high molecular weight polymer and polyurethane in the resultant backing resin, the carpet which has the backing resin formed therewith well stand repeated washing under severe conditions.

More specifically when the composition contains the melamine resin or the vulcanizing agent, or both therein, the aforedescribed reactions take place concurrently, so that there takes place the cross-linking of the high molecular weight polymer and polyurethane in the resultant backing resin by the melamine resin and /or the vulcanizing agent in addition to the cross-linking of the high molecular weight polymer by polyurethane formation, thereby to produce carpet backings more excellent in washability.

The invention will be more easily understood with reference to the following examples, which however are intended to illustrate the invention only and are not to be construed as limiting the scope of the invention.

EXAMPLE I

A blocked polyisocyanate, and optionally an epoxy resin, were added to an acrylonitrile-butadiene rubber (NBR) latex, methyl methacrylate-butadiene rubber (MBR) latex and styrene-butadiene rubber (SBR) latex, respectively, in such amounts as shown in Table I together with heavy calcium carbonate and carboxymethylcellulose to provide compositions having a viscosity of 10000±1000.

The composition was coated uniformly on the backside of a carpet of which base fabric was of polyesters and piles were of polyamides in amounts of 10 kg/m², dried preliminarily at 120° C. for 15 minutes and then hot air dried at 150° C. for 10 minutes.

The resultant carpet having thus backing resins provided therewith was washed in an electric washing machine under the conditions of a carpet/water ratio of 1:30 by weight, a detergent concentration of 0.14% at 40° C. for 7 minutes, and then cold water was overflowen from the washing machine for 10 minutes for linsing, and thereafter the carpet was dried completely at 100° C.. A cycle of this series of steps were repeated 30 times. Thereafter, the dimensional change of the carpet was measured, and the backside of the carpet and the degree of curling of the carpet were investigated. The results are shown in Table I.

as will be apparent, when the composition of Reference Example composed of the latex having fillers and thickners only added thereto was used, the resultant carpet was found to show a large shrinkage after the washing. On the contrary to this, the carpets having the backings formed with the compositions of Examples 1-4, 7 and 8 of the invention were found to be remarkably small in shrinkage, but also substantially no curling was observed, and further there took place no separation of the resin from the carpet. Therefore, the carpets having the backing formed with the composition of the invention were found excellent in washability.

When the compositions of Examples 5 and 6 containing the epoxy resin therein were used, the washability of the carpets was found more excellent and well-balanced.

EXAMPLE II

A blocked polyisocyanate, an water-soluble melamine resin or vulcanizing agent, or both, and optionally an epoxy resin, were added to an acrylonitrile-butadiene rubber (NBR) latex in such amounts as shown in Table II together with heavy calcium carbonate and carboxymethylcellulose to provide compositions having a viscosity of 10000±1000.

The composition was applied to the same carpet as in Example I, and backing resins were formed therewith in the same manner as in Example I. Then the resultant carpets were washed in the same manner as in Example I. The dimensional change of the carpet, the observation of the backside of the carpets and the degree of curling are shown in Table II.

As will be apparent, when the composition of Reference Example composed of the latex having the melamine resin and vulcanizing agent only added thereto was used, the resultant carpet was found to be large in shrinkage and curling after the washing, but also some of the backing resin was separated from the carpet.

On the contrary to the above, the carpets having the backings with the compositions of Examples 1-3 containing the melamine resin as well as the blocked polyisocyanate were found to be remarkably small in shrinkage, and substantially no curling was observed. The compositions of Examples 7-9 containing the vulcanizing agent together with the blocked polyisocyanate also provided the carpets which was remarkably improved in shrinkage and anti-blocking . Further, no separation of the resin from the carpet was observed.

When the compositions of Examples 4-6 and 10-15 having both the melamine resin and the vulcanizing agent added thereto were used, the resultant carpets were found more excellent and well-balanced in washability. In particular, a remarkable improvement in anti-blocking and pile pull strength was attained.

The composition of Example 17 composed of the latex

TABLE I

|  | Examples | | | | | | | | Reference |
|---|---|---|---|---|---|---|---|---|---|
|  | 1 | 2 | 3 | 4 | 5 | 6 | 7 | 8 | Example |
| Compositions[1)] | | | | | | | | | |
| NBR latex[2)] | 100 | 100 | 100 | 100 | 100 | 100 | — | — | 100 |
| MBR latex[3)] | — | — | — | — | — | — | 100 | — | — |
| SBR latex[4)] | — | — | — | — | — | — | — | 100 | — |
| Blocked polyisocyanate[5)] | 5 | 10 | — | — | 5 | 7.5 | 7 | 7 | — |
| Blocked polyisocyanate[6)] | — | — | 5 | — | — | — | — | — | — |
| Blocked polyisocyanate[7)] | — | — | — | 5 | — | — | — | — | — |
| Epoxy compound[8)] | — | — | — | — | 5 | 2.5 | — | — | — |
| Heavy calcium carbonate | 50 | 50 | 50 | 50 | 50 | 50 | 50 | 50 | 50 |
| Thickner | 1.5 | 1.5 | 1.5 | 1.5 | 1.5 | 1.5 | 1.5 | 1.5 | 1.5 |
| Carpets After Washing | | | | | | | | | |
| Shrinkage (%)[9)] | 0.90 | 0.81 | 0.86 | 0.88 | 0.79 | 0.80 | 0.85 | 0.87 | 1.7 |
| Curling[10)] | B | A | B | B | A | A | A | A | C |

TABLE I-continued

|  | Examples | | | | | | | | Reference |
|---|---|---|---|---|---|---|---|---|---|
|  | 1 | 2 | 3 | 4 | 5 | 6 | 7 | 8 | Example |
| Backside[11] | B | A | B | B | A | A | A | A | D |

Notes:
[1] Parts by weight in solids
Carboxy content
Croslene Na-20: 0.58 meq/g-solid
2M-33A: 0.27 meq/g-solid
SA-51: 0.21 meq/g-solid-;
[2]-[4] Croslene NA-20, 2M-33A and SA-51 (all carboxylated latexes) by Takeda Chemical Industries, Ltd., Japan "Japan"
[5] Methyl ethyl ketoximine-blocked adduct of trimethylol propane and tolylene diisocyanate (aqueous emulsion)
[6] Phenol-blocked diphenylmethane diisocyanate (aqueous dispersion)
[7] Methyl ethyl ketoximine-blocked trimers of hexamethylene diisocyanate (aqueous emulsion)
[8] Denacol 521 by Nagase Chemicals, Ltd., Japan
[9] Percentage shrinkage in the longitudinal direction
[10] Three grade estimation A to C by visual observation: A, no curling; C, clear curling
[11] Four grade estimation A to D by visual observation: A, no separation of resins; D, separation of resins from almost all surface of carpets

TABLE II

| | Examples | | | | | | | | | |
|---|---|---|---|---|---|---|---|---|---|---|
| | 1 | 2 | 3 | 4 | 5 | 6 | 7 | 8 | 9 | 10 |
| Compositions[1] | | | | | | | | | | |
| NBR latex[2] | 100 | 100 | 100 | 100 | 100 | 100 | 100 | 100 | 100 | 100 |
| Blocked polyisocyanate[3] | 7 | 7 | 7 | 7 | 7 | 7 | 7 | 7 | 7 | 7 |
| Blocked polyisocyanate[4] | — | — | — | — | — | — | — | — | — | — |
| Epoxy compound[5] | — | — | — | — | — | — | — | — | — | — |
| Vulcanizing agent[6] | — | — | — | 4 | 4 | 4 | 2 | 4 | 6 | 2 |
| Melamine resin[7] | 3 | 5 | 7 | 3 | 5 | 7 | — | — | — | 3 |
| Heavy calcium carbonate | 50 | 50 | 50 | 50 | 50 | 50 | 50 | 50 | 50 | 50 |
| Thickener | 1.2 | 1.2 | 1.2 | 1.2 | 1.2 | 1.2 | 1.2 | 1.2 | 1.2 | 1.2 |
| Carpets After Washing | | | | | | | | | | |
| Shrinkage (%)[8] | 0.70 | 0.70 | 0.68 | 0.61 | 0.60 | 0.61 | 0.66 | 0.70 | 0.72 | 0.68 |
| Curling[9] | A | A | A | A | A | A | A | A | A | A |
| Backside[10] | A | A | A | A | A | A | A | A | A | A |
| Pile pull strength (kg) | 5 | 6 | 7 | 12 | 12 | 12 | 6 | 8 | 10 | 8 |
| Blocking[11] | C | C | B | A | A | A | B | B | B | B |

| | Examples | | | | | | | Reference |
|---|---|---|---|---|---|---|---|---|
| | 11 | 12 | 13 | 14 | 15 | 16 | 17 | Example |
| Compositions[1] | | | | | | | | |
| NBR latex[2] | 100 | 100 | 100 | 100 | 100 | 100 | 100 | 100 |
| Blocked polyisocyanate[3] | 7 | 3 | 5 | 10 | — | 5 | 7 | — |
| Blocked polyisocyanate[4] | — | — | — | — | 7 | — | — | — |
| Epoxy compound[5] | — | — | — | — | — | 2 | — | — |
| Vulcanizing agent[6] | 6 | 4 | 4 | 4 | 4 | 4 | — | 4 |
| Melamine resin[7] | 3 | 3 | 3 | 3 | 3 | 3 | — | 3 |
| Heavy calcium carbonate | 50 | 50 | 50 | 50 | 50 | 50 | 50 | 50 |
| Thickner | 1.2 | 1.2 | 1.2 | 1.2 | 1.2 | 1.2 | 1.2 | 1.2 |
| Carpets After Washing | | | | | | | | |
| Shrinkage (%)[8] | 0.70 | 0.92 | 0.74 | 0.60 | 0.62 | 0.61 | 0.85 | 1.5 |
| Curling[9] | A | B | A | A | A | A | B | C |
| Backside[10] | A | B | A | A | A | A | B | D |
| Pile pull strength (kg) | 12 | 10 | 11 | 12 | 12 | 12 | 3 | 10 |
| Blocking[11] | A | A | A | A | A | A | E | A |

Notes:
[1] Parts by weight in solids
[2] Croslene NA-20 (carboxylated latex) by Takeda Chemical Industries, Ltd., Japan
[3] Methyl ethyl ketoxime-blocked adduct of trimethylol propane and tolylene diisocyanate (aqueous emulsion)
[4] Methyl ethy ketoxime-blocked trimers of hexamethylene diisicyanate (aqueous emulsion)
[5] Denacol 521 by Nagase Chemicals, Ltd., Japan "Japan"
[6] Mixture of 25 parts of powdered sulfur, 50 parts of zinc dibutyl dithiocarbamate and 25 parts of zinc oxide
[7] Sumitex M-3 by Sumitomo Chemical Industry Co., Ltd., Japan "Japan"
[8] Percentage shrinkage in the longitudinal direction
[9] Three grade estimation A to C by visual observation: A, no curling; C, clear curling
[10] Four grade estimation A to D by visual observation: A, no separation of resins; D, separation of resins from almost all surface of carpets
[11] Five grade estimation A to E. After 30 cycle washing, the two wet carpets were placed with backsides faced each other, hot-pressed together, and then dried. A, the two carpets were separated from each other with no resistance; E, the two carpets were firmly adhered together, and were not separated from each other.

containing the blocked polyisocyanate, but no melamine resin nor vulcanizing agent, is within the scope of the invention, however, this Example is presented to illustrate that the employment of the melamine resin and/or vulcanizing agent remarkably improve the pile pull strength and anti-blocking of the backings.

EXAMPLE III

A blocked polyisocyanate, optionally together with an water-soluble melamine and/or a vulcanizing agent, were added to an acrylic resin latex in such amounts as shown in Table III together with heavy calcium carbonate and a thickener, to provide compositions.

The composition was applied to the same carpet as in Example I, and backing resins were formed therewith in the same manner as in Example I, followed by the washing of the carpets in the same manner as in Example I. The dimensional change of the carpet, the observation of the backside of the carpets and the degree of curling are shown in Table III.

The carpets having the backings with the compositions of Examples 1 to 5 were found to be remarkably small in shrinkage, and substantially no curling took place. However, when the composition of Reference Example containing a water-soluble melamine resin, but no blocked polyisocyanate, was used, the resultant carpet was found to show a large shrinkage and the curing and separation of resins were observed. Further the blocking was also observed.

TABLE III

|  | Examples | | | | | Reference Example |
|---|---|---|---|---|---|---|
|  | 1 | 2 | 3 | 4 | 5 |  |
| Compositions[1] | | | | | | |
| Acrylic emulsion[2] | 100 | 100 | 100 | 100 | 100 | 100 |
| Blocked polyisocyanate[3] | 3.5 | 7 | 15 | 7 | 5 | — |
| Vulcanizing agent[4] | — | — | — | — | 4 | — |
| Melamine resin[5] | — | — | — | 3 | 5 | 3 |
| Heavy calcium carbonate | 50 | 50 | 50 | 50 | 50 | 50 |
| Thickner | 1.2 | 1.2 | 1.2 | 1.2 | 1.2 | 1.2 |
| Carpets After Washing[6] | | | | | | |
| Shrinkage (%) | 0.75 | 0.65 | 0.62 | 0.45 | 0.44 | 1.3 |
| Curling | A | A | A | A | A | C |
| Backside | B | A | A | A | A | C |
| Pile pull strength (kg) | 4 | 5 | 5 | 6 | 8 | 6 |
| Blocking | A | A | A | B | A | C |

Notes:
[1] Parts by weight in solids
[2] Ultrasol N-38 (carboxylated latices 0.19 meq/g-solid) by Takeda Chemical Industries, Ltd., Japan "Japan"
[3] Methyl ethyl ketoxime-blocked adduct of trimethylol propane and tolylene diisocyanate (aqueous emulsion)
[4] Mixture of 25 parts of powdered sulfur, 50 parts of zinc dibutyl dithiocarbamate and 25 parts of zinc oxide
[5] Sumitex M-3 by Sumitomo Chemical Industry Co., Ltd., Japan
[6] The same as in Table II.

What is claimed is:

1. A walk on-walk off type carpet or mat comprising a carpet substrate and a backing, said backing being of excellent washability and being produced by applying to the back of the carpet substrate a composition which comprises:
   (a) an aqueous dispersion selected from the group consisting of a styrene-butadiene rubber (SBR), acrylonitrile-butadiene rubber (NBR), methyl methacrylatebutadiene rubber (MBR) and an acrylic latex;
   (b) a blocked polyisocyanate in amounts of about 0.5-30 parts by weight in relation to 100 parts by weight of the solids of the aqueous dispersion; and
   (c) a vulcanizing agent in amounts of about 0.5-10 parts by weight in relation to 100 parts by weight of the solids of the aqueous dispersion.

2. The carpet backing as claimed in claim 1, wherein the composition further contains a melamine resin in amounts of about 0.1-10 parts by weight in relation to 100 parts by weight of the solids of the aqueous dispersion.

3. The carpet or mat as claimed in claim 1 or 2, wherein the composition further contains an epoxy resin in amounts of not more than 10 parts by weight in relation to 100 parts by weight of the solids of the aqueous dispersion.

4. The carpet or mat as claimed in claim 1 or 2, wherein the composition further contains a filler in amounts of not more than about 100 parts by weight in relation to 100 parts by weight of the solids of the aqueous dispersion.

5. The carpet or mat as claimed in claim 3, wherein the composition further contains a filler in amounts of not more than about 100 parts by weight in relation to 100 parts by weight of the solids of the aqueous dispersion.

6. The carpet or mat as claimed in claim 1, wherein the composition comprises:
   (a) an aqueous dispersion of acrylonitrile-butadiene rubber,
   (b) an aqueous emulsion of methyl ethyl ketoxime-blocked adduct of trimethylol propane and tolylene diisocyanate in amounts of about 0.5-30 parts by weight in relation to 100 parts by weight of the solids of the aqueous dispersion;
   (c) a vulcanizing agent in amounts of about 0.5-10 parts by weight in relation to 100 parts by weight of the solids of the aqueous dispersion; and
   (d) a melamine-formaldehyde resin in amounts of about 0.1-10 parts by weight in relation to 100 parts by weight of the solids of the aqueous dispersion.

7. A walk on-walk off type carpet or mat comprising a carpet substrate and a backing, said backing being of excellent washability and being produced by applying to the back of the carpet substrate a composition which comprises:
   (a) an aqueous dispersion selected from the group consisting of styrene-butadiene rubber (SBR), acrylonitrilebutadiene rubber (NBR), methyl methacrylate-butadiene rubber (MBR) and an acrylic latex;
   (b) a blocked polyisocyanate in amounts of about 0.5-30 parts by weight in relation to 100 parts by weight of the solids of the aqueous dispersion; and
   (c) a melamine resin in amounts of about 0.1-10 parts by weight in relation to 100 parts by weight of the solids of the aqueous dispersion.

8. The carpet or mat as claimed in any one of claims 1 to 5 or 7, wherein the aqueous dispersion is an SBR, NBR or MBR latex.

* * * * *